United States Patent
Siegl et al.

(10) Patent No.: US 12,343,910 B2
(45) Date of Patent: Jul. 1, 2025

(54) METHOD FOR PRODUCING AN rPET PLASTIC MATERIAL FOR USE IN A THIN-WALL INJECTION MOLDING METHOD AND CONTAINERS, SUCH AS CUPS, BOWLS, TRAYS OR MULTI-COMPARTMENT PACKAGINGS PRODUCED BY THE THIN-WALL INJECTION MOLDING METHOD

(71) Applicant: ALPLA WERKE ALWIN LEHNER GMBH & CO. KG, Hard (AT)

(72) Inventors: Robert Siegl, Dornbirn (AT); Benjamin Haas, Lauterach (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 0 days.

(21) Appl. No.: 18/858,237

(22) PCT Filed: Apr. 21, 2023

(86) PCT No.: PCT/EP2023/060430
§ 371 (c)(1),
(2) Date: Oct. 18, 2024

(87) PCT Pub. No.: WO2023/203194
PCT Pub. Date: Oct. 26, 2023

(65) Prior Publication Data
US 2025/0108543 A1    Apr. 3, 2025

(30) Foreign Application Priority Data
Apr. 22, 2022 (CH) .................. CH 000468/2022

(51) Int. Cl.
| | | |
|---|---|---|
| B29C 45/00 | (2006.01) | |
| B29B 9/06 | (2006.01) | |
| B29B 17/04 | (2006.01) | |
| B29K 67/00 | (2006.01) | |
| B29K 105/00 | (2006.01) | |
| B29K 105/26 | (2006.01) | |
| B29L 31/00 | (2006.01) | |
| B65D 1/26 | (2006.01) | |
| B65D 1/36 | (2006.01) | |

(52) U.S. Cl.
CPC .......... *B29C 45/0001* (2013.01); *B29B 9/06* (2013.01); *B29B 17/0412* (2013.01); *B29K 2067/003* (2013.01); *B29K 2105/0094* (2013.01); *B29K 2105/26* (2013.01); *B29L 2031/712* (2013.01); *B65D 1/265* (2013.01); *B65D 1/36* (2013.01)

(58) Field of Classification Search
CPC ........... B29C 49/42394; B29C 33/0011; B29C 2045/2695; B29C 2045/1651; B29C 45/1646; B29C 45/1645; B29C 45/16; B29C 45/0001
See application file for complete search history.

(56) References Cited

FOREIGN PATENT DOCUMENTS

| | | |
|---|---|---|
| EP | 1815960 A1 | 8/2007 |
| EP | 2593494 A1 | 5/2013 |
| JP | 2014198422 A | 10/2014 |
| WO | 2012007958 A1 | 1/2012 |
| WO | 2018127431 A1 | 7/2018 |
| WO | 2022167679 A1 | 8/2022 |

OTHER PUBLICATIONS

International Search Report issued by the European Patent Office acting as the International Searching Authority in relation to International Application No. PCT/EP2023/060430 dated Aug. 4, 2023 (6 pages) along with English language translation (4 pages).
Written Opinion of the International Searching Authority issued by the European Patent Office acting as the International Searching Authority in relation to International Application No. PCT/EP2023/060430 dated Aug. 4, 2023 (8 pages).
Awaja Fet al. "Recycling of PET" European Polymer Journal, Pergamon Press Ltd Oxford, GB, vol. 41, No. 7, Jul. 1, 2005 (Jul. 1, 2005), pp. 1453-1477 DOI: 10.1016/J.EURPOLYMJ.2005.02.005 ISSN: 0014-3057, XP004871122 see chapters 2 "Recycled PET" and 6 "ISBM process".
Awaja et al. "Injection stretch blow moulding process of reactive extruded recycled PET and virgin PET blends" European Polymer Journal, Pergamon Press Ltd Oxford, GB, vol. 41, No. 11, Nov. 1, 2005 (Nov. 1, 2005), pp. 2614-2634 ISSN: 0014-3057, XP005059259 the whole document.

*Primary Examiner* — Stella K Yi
(74) *Attorney, Agent, or Firm* — Robert P. Michal, Esq.; Carter, DeLuca & Farrell LLP

(57) ABSTRACT

The invention relates to a method by which a starting material for injection molding having a viscosity of between 0.50 and 0.7 dL/g is produced from a recycled post-consumer PET having a viscosity of between 0.72 and 0.86 dL/g according to ASTM D4603 and a copolymer fraction of at most approximately 3%, adding a low-viscosity PET material. In the method, the comminuted and dried PET material is melted and decontaminated to such a degree that it is suitable for applications in the food sector and the consumer goods sector.

33 Claims, 2 Drawing Sheets

METHOD FOR PRODUCING AN rPET PLASTIC MATERIAL FOR USE IN A THIN-WALL INJECTION MOLDING METHOD AND CONTAINERS, SUCH AS CUPS, BOWLS, TRAYS OR MULTI-COMPARTMENT PACKAGINGS PRODUCED BY THE THIN-WALL INJECTION MOLDING METHOD

CROSS-REFERENCE TO RELATED APPLICATIONS

This application is a national phase entry under 35 U.S.C. 371 of PCT International Application No. PCT/EP2023/060430 filed Apr. 21, 2023, which claims priority to Swiss Patent Application No. CH000468/2022, filed Apr. 22, 2022, the disclosure of each of these applications is expressly incorporated herein by reference in their entirety.

FIELD OF THE INVENTION

The present invention relates to a method for producing an rPET plastic material for use in a thin-wall injection molding method, and to containers produced in the thin-wall injection molding method, such as cups, trays, tubs or web packagings, in particular for storing food.

PRIOR ART

Containers for storing food, such as cups for yogurt, cream, salad dressings, or containers for margarine, curds and the like are now either deep-drawn or manufactured in the thin-wall injection molding method.

Deep drawing produces a punched grid that can only be supplied for recycling with difficulty because the punched grid has to be melted at least a second time. Many companies only partially manage internal recycling, i.e. the utilization of waste from their own production lines.

In contrast to the deep drawing process, the thin-wall injection molding process does not produce a punch grid. The thin-wall injection molding process is therefore becoming increasingly important for the production of food containers, especially because the largest quantities are processed in the food sector.

Polyolefins, such as polypropylene (PP), high-density polyethylene (HDPE), and also polystyrene, such as high impact polystyrene (HIPS), are currently processed in both deep-drawing and injection molding technology. The mentioned materials are widespread, but have not yet managed to obtain approval from the European Food Safety Authority in the recycling method after use by the end consumer (post-consumer recycling).

Since the environmental goals of the EU and legislation require plastic recycling, but the aforementioned materials do not have approval for direct food contact, they can only be sold on the market for a limited period of time or with burdensome incentive taxes.

The standard PET types used nowadays for the production of bottles in an injection stretch blow molding process are predominantly linear PET types (non-branched) with a low copolymer fraction of less than 5 wt % and an intrinsic viscosity (IV) between 0.72 and 0.86 dL/g (according to ASTM D 4603). In the processing of PET using the one- or two-stage stretch blow molding process (injection stretch blow molding=ISBM), the most commonly used one in practice, the material viscosity typically decreases to between 0.01 and 0.09 dL/g, while the copolymer content is essentially retained. Investigations have shown that the copolymer fraction can rise slightly, since non-typical packages with higher copolymer are also part of the recycling stream and cannot be easily sorted out. In addition, reactions occur in which more diethylene glycol (DEG) is formed, and more DEG is incorporated into the polymer chain.

In contrast to the injection stretch blow molding process used most frequently for the production of PET bottles, however, viscosities of between 0.5 and 0.7 dL/g are required for thin-wall injection-molding. This means that the material obtained in the standard PET recycling process, and common materials reclaimed therefrom, cannot be used for the injection-molding process.

According to recent legislation, the European packaging industry is required to use up to 35% recycled material in newly-manufactured PET articles. This legal requirement relates to both the ISBM method and the injection-molding method. In principle, it would be desirable if the articles produced by injection-molding, the materials of which have a low viscosity, could be collected separately, so that the recovered material could be used again for the production of injection-molded articles. Unfortunately, however, this is not yet possible for economic reasons, since the economies of scale with very low quantities does not allow this separate collection and recycling stream.

In the standard PET recycling stream, however, the low-viscosity injection-molded articles, which are generally only available in small quantities, are not a problem, since the chain lengths are mutually compensating due to the cross-esterification occurring in the melt, and very low viscosities quickly and easily build up in the recycling plant, particularly through condensation in an SSP process.

PET for blow molding processes, with a viscosity of 0.72 to 1.4 dL/g according to ASTM D4603, is much too hard and viscous to allow molding of complicated, thin-walled articles. In a situation where one wants to mold injection-molded articles at a customary pressure of up to 3,000 bar, for a ratio of wall thickness (L) to flow path (D) that is customary for injection-molding (1 to 100 to 1 to 350 (thin-wall injection-molding up to 1 to 500), no standard PET can be used, because large areas of the die could then not be filled.

PET materials, as virgin material, with a viscosity of 0.5 to 0.7 dL/g (ASTM D4603) designed precisely for these applications, are known. However, there is no separate recycling stream precisely for these polyester types. Packaging manufacturers who wish to use precisely this material, will nevertheless have to demonstrate a recycled material fraction of 25% to 50% in the future, depending upon which statutory regulation or voluntary commitments are binding for the producer until 2025 or 2030. However, a much higher recycled material fraction of 40 to 100% is usually required for polyester applications.

A PET recycling material with a viscosity of 0.5 to 0.7 dL/g is required for packaging produced by injection-molding. This seems very simple at first glance; after all, PET can be brought down to the planned viscosity very easily using water and heat.

If 100 to 4,000 ppm water is added to the commercially available PET recycling material for PET injection-molding, the PET decomposes precisely as planned to a viscosity of 0.5 to 0.7 dL/g; however, due to this decomposition (hydrolysis), the material is cloudy-white and partially crystalline. Bubbles also arise to a certain degree. The uncontrolled crystallization gives rise to depressions, cavities, and highly stretched parts which, due to the low viscosity and high inherent stress, are also much too brittle for the final application as packaging.

The commercially available PET main recycling stream consists largely of PET bottles produced from a material having a viscosity of about 0.72 to 0.86 dL/g in an injection stretch blow molding process (ISBM process). This recycling stream has too high a viscosity for the injection-molded thin-walled parts. The commercially available recycled goods from the main stream primarily contain PET ISBM bottles with a copolymer fraction of 2 to 3%. This copolymer fraction fluctuates greatly depending upon whether there are many films and deep-drawn articles, PET-G, or multi-use bottles in the recycling goods. In general, the copolymer fraction is too unpredictable to be able to produce stable, thin-walled injection-molded parts from rPET, which must not crystallize in an uncontrolled manner.

Due to other components in the recycling stream, e.g., deep-drawing films, and due to the decomposition of PET during processing, the average viscosity in the recycling goods is less than the starting material by 0.02 to 0.09 dL/g; however, the material must be decontaminated using heat and vacuum (or nitrogen) to be suitable for contact with food. This decontamination can take place in a dryer upstream of the recycling extruder, in the recycling extruder, or downstream of the recycling extruder in a so-called SSP process. Combinations are also frequent.

In the decontamination, not only is the material degassed, but the polyester product inevitably builds up again under these conditions, and the chains become longer.

Even though highly decomposed PET is found on the market, which would be suitable in terms of viscosity, it is not suitable for the production of a thin-walled PET injection-molded packaging as far as composition and contamination are concerned. This is because it was not decontaminated under vacuum, and moreover crystallized too quickly.

It is known that PET can be decomposed in a targeted manner by the addition of monoethylene glycol (glycolysis). WO001997020886A1 discloses, for example, a method which makes previously used polyester materials available for recycling, with the aid of glycolysis and subsequent cleaning. In this case, recycled PET is contacted at a temperature in the range from 150 to 300° C. for between 10 minutes and 4 hours with 1.1 to 10 moles ethylene glycol per mole of dicarboxylic acid in the polyester, in order to depolymerize the polyester and to produce a reaction mixture which contains monomeric and oligomeric dihydroxy species. Excess ethylene glycol is then removed, and the reaction mixture is dissolved in a hot solvent. The hot solution is then filtered to remove unwanted impurities. Next, the solution is cooled, and the dihydroxy-species are precipitated as solids.

It is also known that PET is transesterified by the addition of low molecular weight esters or polyesters (cross and trans-esters), and the viscosity under heat is balanced by exchanges of polyester in the chain. For example, a polyester with the monomers A and B and a second polyester with the monomers B and C can form by transesterification a third copolyester which contains monomers of types A, B, and C in its chains. This is known for PET polyesters with isophthalic acid (IPA) and diethylene glycol (DEG), as well as for PET copolyesters with napthalenedicarboxylic acid (NDC) and furandicarboxylic acid (FDCA).

Unlike polypropylene (PP) or polystyrene (PS), polyethylene terephthalate (PET) is very sensitive in the injection molding method and quickly forms degradation products that manifest themselves as gases, which immediately leads to problems in PET thin-wall injection molding. Tests have shown that PET materials with a viscosity between 0.2 and 0.4 dL/g (measured according to ASTM D4603) can be injected, but either break during demolding or afterwards in free fall from a drop height of 0.5 to 1.5 m.

Another disadvantage of containers made from PET material is that they tend to stick together when they are placed on top of each other or stacked immediately after production. The containers placed on top of each other or stacked are therefore difficult to separate from each other.

OBJECT OF THE INVENTION

The object of the present invention is to propose a thin-walled container made of PET, in particular for the storage of food, in the injection molding method, which can be easily demolded and is so stable that it does not shatter when dropped from a height of 1.5 m. An object is also to provide an rPET material which is suitable, in particular, for thin-wall injection-molding and contains a very large amount of rPET which is obtained from the collection of post-consumer PET articles, and in particular blow-molded PET bottles. A further aim is to propose an rPET material that can be injection molded at 1000 to 5000 bar, and ideally at pressures between approx. 1500 and 2500 bar, particularly preferably at about 2100 bar, at a ratio of wall thickness to flow path that is customary for injection-molding of 1 to 100 to 1 to 400, or to 1 to 500 for thin-wall injection-molding. In particular, the aim is that the proposed material crystallizes only slowly. A further aim is that the material can be processed in such a way that it remains transparent, i.e., substantially glass-clear, and no crystallization of the material scatters the light in such a way that the content is no longer visible. Another goal is for the containers to not stick together when they are placed on top of each other or stacked after production.

DEFINITIONS

In the context of the present invention, the term, "viscosity", is understood to mean the intrinsic viscosity (IV) measured according to the ASTM 4603-03 standard.

In the context of the present invention, "correctly sorted PET" is understood to mean that PET has been sorted within the scope of today's technological possibilities so that the weight-based proportion of non-sorted plastic is less than 2%, preferably less than 1%, and particularly preferably less than 0.5%.

rPET is used in the present case as a short designation for recycled post-consumer PET.

"Bottle grade PET post-consumer recycling flake" is rPET processed to form flakes, which originates from the collection of post-consumer PET articles, and in particular PET bottles In the context of the present invention, ISBM PET is understood to mean PET (including PET copolymers) which is suitable for use in an ISBM process, i.e., has an IV between 0.72 dL/g and 0.86 dL/g (viscosity measurement according to ASTM D4603).

In the context of the present invention, "chain breaker" is understood to mean a chemical compound which is suitable for decomposing PET or being incorporated as a copolymer into the polymer chain.

A "flow path" refers to the distance between the injection point and the furthest point.

Containers are understood to mean in particular cups, trays and tubs, wherein in particular in the case of cups and tubs, the area that is enclosed by the edges of the opening of the container is generally larger than the base area. Furthermore, web packaging with several adjacent receiving tubs or trays should also be considered as containers.

DESCRIPTION

The invention relates to a method for producing an rPET plastic material for use in a thin-wall injection-molding process, with a ratio of wall thickness (L) to flow path (D) of 1 to 50, 1 to 400, comprising the method steps of a) sorting, washing, and comminuting post-consumer PET articles-mostly PET bottles produced by an ISBM process—the PET material of which has an intrinsic viscosity between 0.72 and 0.86 dL/g according to ASTM D4603, b) removing impurities, such as metal or paper, before, simultaneously with, or after method step a), c) subsequently drying the comminuted PET material, d) subsequently melting the comminuted and dried PET material and preferably decontaminating it in a degassing and/or recycling extruder, and then granulating it, wherein a solid-state condensation (SSP process) can optionally take place upstream and/or downstream, and e) producing a thin-walled injection-molded article from the PET material in an injection-molding process.

According to the invention, the object is achieved in that that a low-viscosity virgin PET, hereinafter referred to as "vPET", is added to the granulated material and the mixture of granules and vPET is reactively extruded and injected directly into an injection mold, wherein the process is carried out in such a manner that the intrinsic viscosity of the injection-molded article is lowered to 0.5 to 0.7 dL/g during the extrusion, and preferably to 0.5 to 0.65 dL/g, and a thin-walled injection-molded article which has a ratio of wall thickness (L) of the injection-molded article to the flow path (D) of 1 to 50 to 1 to 400, or to 1 to 500 for thin-wall injection-molding, can be produced in an injection-molding method. What is new and surprising is that PET materials with a very short chain length and recycled PET from the bottle recycling stream with a long chain length can be combined in such a way that the material is ideally suited for injection molding of the products. This method therefore has the advantage that rPET from a conventional PET recycling stream, and in particular from blow-molded PET bottles, can also be used for the production of thin-walled injection-molded articles. Various tests have shown that by adding post-consumer recycling material with a higher viscosity of 0.6 to 1.0 dL/g, a mixing ratio can be adjusted so that the final product has a viscosity of 0.5 to 0.7 dL/g and can be demolded without any problems or withstands a drop height of 0.5 to 1.5 m during demolding.

Advantageously, the temperature during extrusion and the residence time of the material in the extruder are selected such that the extruded material has an intrinsic viscosity (IV) greater than 0.5 dL/g, in particular between 0.52 and 0.68 dL/g, and preferably between 0.55 and 0.65 dL/g. Such material can be easily processed into thin-walled, strip-free articles.

Advantageously, the vPET has an intrinsic viscosity between 0.2 and 0.45 dL/g, preferably between 0.25 and 0.40 dL/g measured according to ASTM D4603. Virgin PET with the aforementioned viscosities can be ideally combined with rPET from bottle recycling.

Advantageously, the proportion of rPET in the mixture is between 20 and 80 wt. %, preferably between 30 and 70 wt. % and particularly preferably between 40 and 60 wt. %. With such a high proportion of rPET, even the latest legal regulations can be complied with.

In order to obtain stable and shatter-proof containers, the mixture is preferably extruded at temperatures between 250 and 350° C.

Advantageously, the mixture is preheated before entering the extruder. This can prevent degradation of the material. Advantageously, the mixture is preheated to a temperature between 70 and 170° C., measured at the extruder inlet. This allows the shear forces acting on the mixture in the extruder to be significantly reduced.

According to a preferred method variant, the mixture is dried before extrusion so that the water content is less than 100 ppm. This allows reproducible conditions to be created. It has in particular been shown that the moisture in the material is strongly dependent on the storage conditions. The longer a material is stored, the more moisture it can absorb. The higher the ambient humidity and the higher the ambient temperature, the faster the material in granular form absorbs moisture. The size of the granules, the packaging as well as the handling and storage in the plant also play a role here.

The inventors have found that all factors that affect humidity have a direct impact on the viscosity of the PET material. In order to be uninfluenced by weather, storage conditions and other influences, it is important to work with dried PET blends. The injection conditions must under no circumstances depend on the weather, the granule size and other factors influencing humidity. To carry out the method according to the invention, a certain, always constant humidity or minimum humidity below 100 ppm is aimed for.

The drying of the PET material or the mixture with rPET with hot air, nitrogen or a vacuum should preferably be carried out in such a way that the material in the dryer does not build up uncontrollably due to the removal of water, glycol and diethylene glycol, and thereby become unsuitable for thin-wall injection molding. For this purpose, temperature and residence time must be accordingly adjusted.

Unlike the PET stretch blow molding process for bottles, very low drying conditions have proven effective, typically between 100 and 160° C., ideally with a residence time of 4 to 24 hours. In the case when dry air is used, the aim is to dry the air with a dew point between −80 and −10° C. In addition, an air volume between 0.5 and 3 m$^3$/kg PET is preferably used in the drying process.

The aim is to build up a viscosity of less than 0.01 dL/g in the dryer.

In order to produce containers from a mixture of vPET and rPET, an extrusion machine is required that can generate a pressure between 500 and 5000 bar, preferably between 1500 and 2500 bar.

It is advantageous to use an injection molding machine that can inject faster than 10 g/sec per nest. This condition must be achievable if containers are to be manufactured from a mixture of vPET and rPET. Preferably, a PET bottle stream is used, which contains particularly few impurities of polymers other than PET (for example, PA blends). In the context of the present invention, "particularly few" is understood to mean that the proportion of PA blends, radical scavengers, and other additives such as, for example, oxygen scavengers, acetaldehyde scavengers, UV absorbers, slip additives, infrared absorbers, etc., is less than 10 wt %, preferably less than 5 wt %, and particularly preferably less than 3 wt %.

Advantageously, with an rPET content of preferably more than 30, 40 or 50%, a chain breaker is additionally added in process step e). By adding a chain breaker, the higher viscosity material can be further reactively degraded to obtain a material with an intrinsic viscosity between 0.5 to 0.7 dL/g.

According to one method variant, either a certain amount of monoethylene glycol or a certain amount of water is used as a chain breaker. With the aid of monoethylene glycol or water, the IV can be lowered by cleaving the PET molecules directly during the actual injection-molding method to the extent that thin-walled articles can be produced.

Preferably, PET recycling material used for the extrusion has a water content between 100 and 1,000 ppm and preferably between 300 and 1,000 ppm water. This means that the previous drying and decontamination is preferably carried out such that the desired water content arises. Alternatively, the PET recycling material can also be enriched again with water after the drying and/or decontamination (method steps c) and/or d)).

Instead of water, between 50 and 1,000 ppm monoethylene glycol can also be added and/or metered to the granulated material. This likewise leads to the desired lowering of the intrinsic viscosity during the injection-molding process.

According to another preferred method variant, compounds which can be incorporated into the PET polymer molecules and thus lead to a higher copolymer fraction are used as chain breakers. Surprisingly, by increasing the copolymer fraction, the intrinsic viscosity can be reduced, and the crystallization speed can be slowed down to such an extent that thin-walled, transparent, and strip-free articles can be injection molded. This effect was unexpected, since it had to be assumed that a clouding of the material would take place. Furthermore, it had been expected that bubbles and small cracks would form in the injection-molded article, similar to when water is used for the decomposition of the rPET. As a result of the addition of suitable chain breakers and their incorporation into the PET polymer chains, the proportion of copolymers during the extrusion can be raised by at least 1%, preferably at least 2% and particularly preferably at least 3%, as desired, and the viscosity of the material can be reduced. The proposed method makes use of the effect that higher copolymer fractions change the PET molecular chain such that crystallization is inhibited or suppressed as a result.

Monoethylene glycol is a known chain breaker. Monoethylene glycol, however, is already part of the PET chain. As a result of the addition of monoethylene glycol, the chain is cleaved, but the copolymer fraction is not increased.

It is advantageous to use diols, which can be incorporated as copolymer into the chain, as chain breakers. Preferred diols are diethylene glycol, propylene glycol, and/or butylene glycol, as well as cyclic polyalcohols, such as 3,9-bis(1,1-dimethyl-2-hydroxyethyl)-2,4,8,10-tetraoxaspiro[5.5]undecane (spirolglycol).

According to another method variant, dicarboxylic acids are used as chain breakers. These are likewise very suitable for reducing the chain lengths.

Preferred dicarboxylic acids as chain breakers are isophthalic acid, 2,5-furandicarboxylic acid, and/or naphthaledicarboxylic acid, since these can be incorporated as copolymer into the polymer chain.

According to an advantageous method variant, diesters are used as chain breakers. Suitable diesters are, for example, dimethyl isophthalate and/or bis(hydroxyethyl) isophthalate.

The diols, dicarboxylic acids, and diesters can each be used individually or as mixtures.

Advantageously, PET copolymer chains with 2 to 20 monomers with an isophthalic acid (IPA), furandicarboxylic acid (FDCA), naphthalenedicarboxylic acid, or diethylene glycol fraction are used as chain breakers.

The isophthalic acid (IPA), furandicarboxylic acid (FDCA), naphthalenedicarboxylic acid, or diethylene glycol fraction is, expediently, between 3 and 10 wt %.

It is also conceivable to use compounds which have an alcohol group and a dicarboxylic acid or an ester group as chain breakers. Examples of such compounds are hydroxyethanoic acid (hydroxyacetic acid), hydroxypropanoic acid, and hydroxybutanoic acid.

Advantageously, the chain breaker is added in method step f) before or during the melting of the granulate.

Advantageously, the post-consumer PET material used has a copolymer fraction of not more than about 3% and preferably a copolymer fraction of at most 2.5% before the drying and recycling in method step d).

The method step f) is preferably carried out in such a manner that the copolymer fraction in the rPET, in total, is raised to 2.5 to 8% preferably to 3.0 to 8%, and particularly preferably to 3.5% to 8%. An increased copolymer fraction leads to a reduction in the IV and at the same time a slowing of the crystallization rate, which makes the injection-molding of thin-walled articles possible.

Advantageously, a decontamination of the post-consumer input goods is carried out by degassing the volatile contaminants at elevated temperature between 70° and 330° C., and preferably between 180 and 220° C., upstream of the recycling extruder, i.e., method step d), and/or in the recycling extruder and/or downstream of the recycling extruder, with a vacuum of less than 0.2 bar absolute, and/or with nitrogen flushing between 0.1 sec and 20 hours, and preferably 4 to 10 hours.

After extrusion in the recycling extruder, the granulate can optionally be degassed in an SSP reactor at a temperature of 180 to 220° C. for 1 to 15 hours, and preferably 4 to 10 hours, at negative pressure. A polymerization (polycondensation) takes place simultaneously.

The decontamination under heat and vacuum can take place in the extruder and in the subsequent SSP reactor. Of course, nitrogen can also be used instead of vacuum to remove contamination. Heat and vacuum or a protective gas atmosphere (e.g., nitrogen) can in principle already be used in the material treatment before the recycling extruder.

The material is preferably decontaminated by subsequent treatment in the SSP reactor, but the viscosity thereof is not raised high enough to make a PET which is well suited for the stretch blow molding process; rather, it leaves the SSP at a viscosity of <0.72 dL/g.

Preferably, prior to the actual injection-molding method step f), the material is decontaminated to such an extent that it is suitable for applications in the food and/or utensils sector.

A master batch of the chain breaker is, advantageously, produced, and this master batch is metered directly into the inlet of the injection-molding machine. This has the advantage that the proportion of chain breakers can be controlled very well, and good mixing take place in the extruder.

Preferably, the comminuted PET recycling material is dried after the washing process at temperatures between 60 and 180° C. for 1 to 8 hours.

The reactive extrusion in method step f) advantageously reduces the intrinsic viscosity of the material used by 0.05 to 0.3 dL/g, and preferably 0.1 to 0.25 dL/g.

Advantageously, the crystallization fraction of the treated rPET injection part is reduced by at least 10% compared to the untreated material without an increased copolymer fraction.

According to a preferred method variant, the temperature during extrusion and the amount of chain breaker are selected such that the extruded material has an IV greater than 0.5 dL/g and in particular between 0.5 and 0.7 dL/g.

Advantageously, between 0.05 wt % and 2.8 wt %, preferably between 0.1 wt % and 1.0 wt %, and particularly preferably between 0.1 wt % and 0.6 wt % of chain breaker is added to the PET of method step f).

The residence time of the polyester material in the injection-molding unit or recycling extruder is advantageously in each case between 20 and 400 sec., preferably between 30 and 300 sec., and particularly preferably between 40 and 200 sec. With the aforementioned residence times, the IV of the polyester material can be lowered by 0.05 to 0.3 dL/g in the presence of a chain breaker during extrusion.

According to a further embodiment of the invention, the extruded melt is filtered before the granulation.

According to a further embodiment of the invention, the extruded melt is pressed through a hole filter having a hole size between 30 μm and 300 μm, and preferably between approximately 50 μm and 100 μm. As a result, the melt has sufficient purity, and turbidities and impurities are prevented in the injection-molded end product.

According to a further embodiment of the invention, the rPET material is degassed and decontaminated during the extrusion in method step d).

According to a further variant, the melt is divided into thin layers or strands in the extruder. As a result, the surface of the material is enlarged, and the decontamination can be carried out very quickly.

According to an embodiment of the invention, the extrusion takes place in vacuum or in a protective gas atmosphere, and in particular under nitrogen.

In a further embodiment of the method, it is an alternative form of injection-molding or a mixed form of injection-molding in the sense of compression molding or continuous compression molding.

In a further embodiment of the method, it is an alternative form of injection-molding and/or a mixed form of injection-molding in the sense of injection foaming.

The object of the present invention is also a container produced in an injection molding method, in which the base area of the container is smaller than the area that is enclosed by the edges of the opening of the container, optionally with one or more chambers, in particular for storing foodstuffs, preferably with an acetaldehyde and formaldehyde value of less than 50 ppm and a wall thickness between 0.1 and 0.5 mm, preferably with a wall thickness between 0.2 and 0.4 mm, and particularly preferably with a wall thickness between 0.24 and 0.34 mm and a pouring area that is larger than the base area.

According to the invention, the container is produced from a mixture of virgin PET with at least 5 wt. % rPET obtainable from the processing of PET bottles mostly produced using the ISBM method, the PET material of which has an intrinsic viscosity between 0.72 and 0.86 dL/g according to ASTM D4603, wherein the mixture produced from the virgin PET and the rPET has a viscosity between 0.5 and 0.7 dL/g. These can be designed as a cup, tray, tub or as web packaging, the base area of which is smaller than the area that is enclosed by the edges of the opening of the container.

Preferably, the virgin PET has an intrinsic viscosity between 0.2 and 0.45 dL/g, preferably one between 0.25 and 0.40 dL/g.

Preferably, rPET is used which has an intrinsic viscosity between 0.6 and 1.0 dL/g.

The container is advantageously designed as a cup, tray, tub or as web packaging. According to an advantageous embodiment, webs or ribs are provided or formed on the side surfaces of the container in order to prevent containers placed or stacked on top of one another from sticking together. This has the advantage that no large surface contact is possible between the containers, for example in the event that they are stacked, and sticking together is therefore prevented.

To prevent the freshly produced containers from sticking together, the container can alternatively have an average surface roughness between 0.2 and 0.4 μm and preferably between 0.25 and 0.35 μm, ideally about 0.3 μm, measured according to DIN EN ISO 4287-2010. This can also prevent the surfaces from sticking together.

Another way to prevent sticking together is to add an anti-blocking agent to the mixture. Natural or synthetic silica, talc, calcium carbonate, microspheres of glass, PMMA microspheres or those made of cross-linked silicone can be used as antiblocking agents.

Another way to prevent sticking together would be to use labels that are introduced during the injection molding process. It is important in this context that the labels used for this meet the recycling requirements.

Advantageously, the container has an injection point which is arranged in a recess in the region of the bottom area of the container in such a way that the remaining bottom area forms a flat standing surface. This has the advantage that the container can lie flat.

Advantageously, the opening of the container can be closed by means of a closure cap that can be snapped into the opening edge.

According to another embodiment, the opening can be closed with a sealing film that is compatible with the recycling requirements.

Example containers are shown in the figures. In the figures:

| | |
|---|---|
| FIG. 1 | shows a container with vertical webs on the sides; |
| FIG. 2 | shows a container with multiple chambers or compartments, each with webs on the side surfaces to minimize the contact area of stacked containers; |
| FIG. 3 | shows a flat tray with several chambers; and |
| FIG. 4 | shows a yogurt cup with a film to seal the yogurt cup. |

FIG. 1 shows a rectangular container 11a in the form of a tray with a bottom 13, four side walls 15 and a flat peripheral edge 17. On the side walls, webs 19 are formed which minimize the contact area between containers 11a stacked on top of each other. The container 11a has an opening 21 whose area is larger than the bottom area.

DESCRIPTION OF THE METHOD

Figure 1:
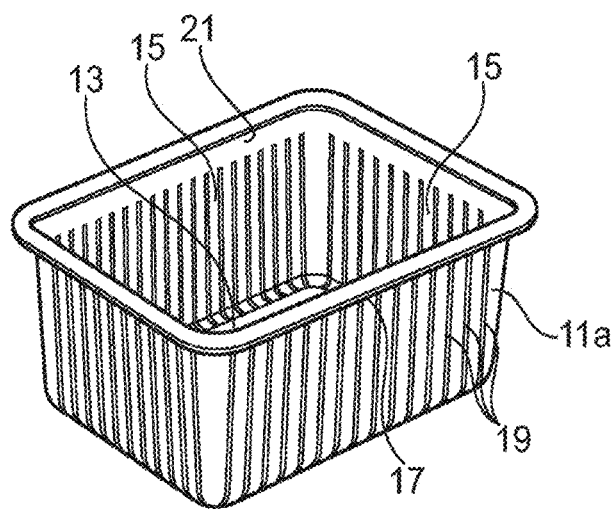
Figure 2:
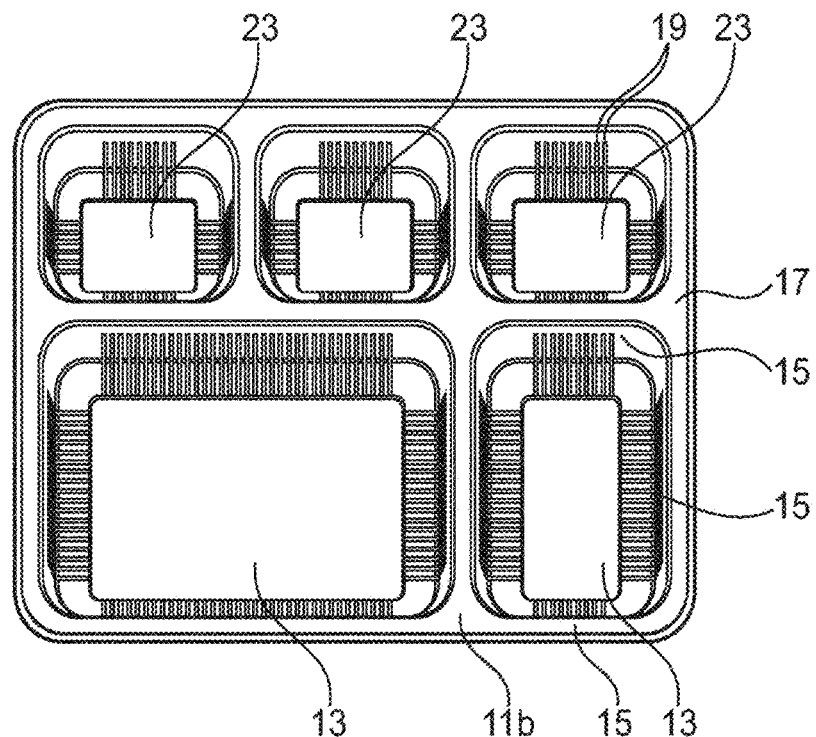
FIG. 2 shows a short container 11b with multiple chambers 23.
Figure 3:
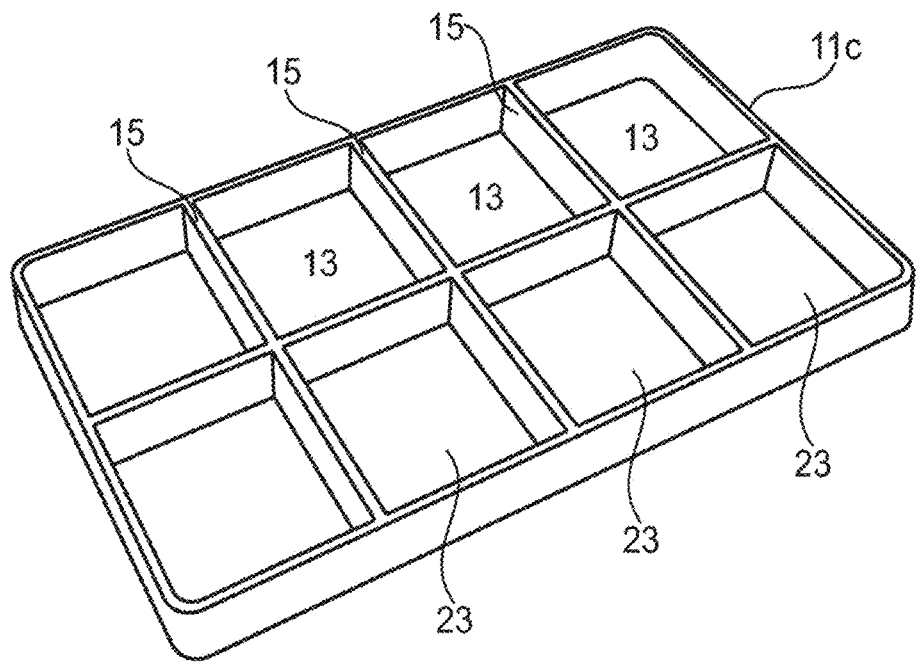
FIG. 3 shows another possible embodiment of a container 11c with eight regularly arranged chambers 23. The bottom area of each chamber is always smaller than the chamber openings.
Figure 4:
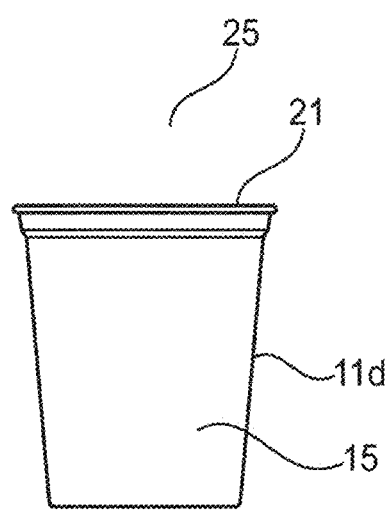
FIG. 4 shows a yogurt cup 11d which is provided with a removable foil.

For the method, post-consumer PET material having a viscosity between about 0.7 and about 0.86 dL/g is used.

Preferably, a PET bottle stream is used which contains particularly few impurities of polymers other than PET (for example, PA blends). In the context of the present invention, "particularly few" is understood to mean that the proportion of PA blends, radical scavengers, and other additives such as, for example, oxygen scavengers, acetaldehyde scavengers, UV absorbers, slip additives, infrared absorbers, etc., is less than 10 wt %, preferably less than 5 wt %, and particularly preferably less than 3 wt %.

In a first process step, post-consumer PET bottles are sorted into a single type, washed, and cut, and impurities such as metal, paper, etc., are removed. During sorting, the collected PET material is initially sorted for color, and then foreign plastics are preferably sorted out.

In a second process step, the cut PET flakes are dried.

In a third process step, the rPET is decontaminated and granulated in a degassing or recycling extruder.

In a fourth process step, a certain amount of a low-viscosity virgin PET (vPET) is added to the granules, and then the resulting mixture of granules and vPET is extruded and preferably injected directly into an injection mold. Under these conditions, the average molecular weight of rPET and therefore the intrinsic viscosity decreases sharply during extrusion in the injection-molding unit.

The addition of the chain breaker is predominantly envisaged in the injection-molding unit, but can alternatively be added in rare cases or complementarily in the recycling extruder. As a result of the addition of chain breaker not only in the extruder of the injection-molding machine, but also in the extruder of the recycling machine, the recycling material can be deliberately decomposed and enriched with copolymers in the extrusion process.

EXEMPLARY EMBODIMENTS

Example 1

50% of the cup weight is with virgin PET with a viscosity of 0.40 dL/g with 50% ground material of post-consumer PET bottles with an average IV of 0.72 dL/g and an average copolymer fraction of 1% isophthalic acid and 1.3% diethylene glycol are admixed with 0.5% diethylene glycol in a recycling extruder, and extruded at 290° C. on average. Surprisingly, the viscosity after the recycling extruder was reduced much more than usual, to a value of only 0.58 dL/g. After a subsequent SSP (6 h at 220° C., to achieve food contact compliance), the granulate had built up only to 0.72 dL/g. The mixture of both materials resulted in a viscosity of the cup material of 0.55 dL/g, which allowed this cup to be injected with a flow path of 120 mm at a 1 mm wall thickness.

Example 2

70% regranulate is added to 30% of the cup weight made of virgin PET with a viscosity of 0.40 dL/g. The regranulate comes from ground material from post-consumer bottles, which is converted in an SSP reactor in a conventional recycling process into granules for the stretch blow molding process with a viscosity of 0.76 dL/g. The dried granulate and the regranulate are dried together (180° C.-6 h, dried air, 2 m² air/kg PET, dew point −35° C.) and fed to an injection-molding machine and admixed with 0.1% diethylene glycol. In the melt, the diethylene glycol brought the PET down to a viscosity of 0.61 dL/g, and, surprisingly, it was possible to mold a preform with only 1 mm wall thickness and 120 mm flow path.

The invention provides a method by which previously used polyester materials, including either production waste polyester materials and/or used polyester materials, can be recovered and purified conveniently and efficiently. The collected PET material, which has an intrinsic viscosity between 0.72 and 0.86 dL/g according to ASTM D4603, is first sorted by color, preferably re-sorted, cut into small pieces (ground), washed, dried, extruded and preferably simultaneously decontaminated, granulated, and if necessary built up and decontaminated again and then extruded into a thin-walled article with the addition of a low-viscosity virgin PET with an intrinsic viscosity between 0.2 and 0.45 dL/g. It is important that the intrinsic viscosity of the injection-molded article is reduced to 0.5 to 0.7 dL/g and preferably to 0.5 to 0.65 dL/g during extrusion.

The invention relates to a method in which a recycled post-consumer PET having a viscosity of between 0.72 and 0.86 dL/g according to ASTM D4603 and a copolymer fraction of not more than about 3 wt % is used to produce a starting material for injection-molding having a viscosity between 0.50 and 0.7 dL/g. In the method, the comminuted and dried PET material is melted and decontaminated to such a degree that it is suitable for applications in the food sector and the consumer goods sector. A certain amount of a virgin PET is added to the rPET material in the melt of the recycling extruder and/or preferably the melt of the injection unit in order to lower the viscosity and to optionally enrich the PET with copolymers.

The invention claimed is:

1. A method for producing an rPET plastic material for use in a thin-wall injection-molding method, with a ratio of wall thickness (L) to flow path (D) of 1 to 50 to 1 to 500 for thin-wall injection-molding, in which method
   a) post-consumer PET articles-mostly PET bottles produced by an ISBM process—the PET material of which has an intrinsic viscosity between 0.72 dL/g and 0.86 dL/g according to ASTM D4603, are sorted, washed, and comminuted,
   b) impurities, such as metal or paper, are removed before, simultaneously with, or after method step a),
   c) the comminuted PET material is subsequently dried,
   d) the comminuted and dried PET material is subsequently melted and then granulated, and
   e) a thin-walled injection-molded article is produced from the PET material in an injection-molding method,
   wherein
   f) in method step e), a low-viscosity virgin PET, hereinafter referred to as "vPET", is added to the granulated material, and the resulting mixture of granules and vPET is extruded and injected directly into an injection mold,
   wherein the process is carried out in such a manner that the intrinsic viscosity of the injection-molded article is lowered to 0.5 dL/g to 0.7 dL/g during the extrusion.

2. The method according to claim 1, wherein the temperature during extrusion and the residence time of the material in the extruder are selected such that the extruded material has an intrinsic viscosity (IV) greater than 0.5 dL/g.

3. The method according to claim 1, wherein the vPET used has an intrinsic viscosity between 0.2 dL/g and 0.45 dL/g.

4. The method according to claim 1, wherein the proportion of rPET in the mixture is between 20 wt. % and 80 wt. %.

5. The method according to claim 1, wherein the mixture is extruded at temperatures between 250° C. and 350° C.

6. The method according to claim 1, wherein the mixture is preheated before entering the extruder.

7. The method according to claim 6, wherein the mixture is preheated to a temperature between 70° C. and 170° C., measured at the extruder inlet.

8. The method according to claim 1, wherein the mixture is dried before extrusion so that the water content is less than 100 ppm.

9. The method according to claim 1, wherein the extrusion takes place at a pressure between 500 bar and 5000 bar.

10. The method according to claim 1, wherein an injection molding machine is used which can inject faster than 10 g/sec per nest.

11. The method according to claim 1, wherein a PET bottle stream is used in which the proportion of PA blends, radical scavengers, and other additives, such as, for example, oxygen scavengers, acetaldehyde scavengers, UV absorbers, slip additives, infrared absorbers, etc., is less than 10 wt %.

12. The method according to claim 1, wherein a solid state condensation (SSP process) takes place before and/or after method step d).

13. The method according to claim 1, wherein when method step e) has an rPET content of more than 50%, a chain breaker is additionally added.

14. The method according to claim 13, wherein either a certain amount of monoethylene glycol or a certain amount of water is used as the chain breaker.

15. The method according to claim 13, wherein dicarboxylic acids, diesters, PET copolymer chains with 2 monomers to 20 monomers, with an isophthalic acid (IPA), furandicarboxylic acid (FDCA), naphthalenedicarboxylic acid, or diethylene glycol fraction, are used as the chain breakers.

16. The method according to claim 13, wherein compounds which have an alcohol group and a dicarboxylic acid or an ester group, such as, for example, hydroxyethanoic acid, hydroxypropanoic acid, hydroxybutanoic acid, and the like, are used as the chain breakers.

17. The method according to claim 11, wherein the admixture of the chain breaker in method step f) takes place before or during the melting.

18. The method according to claim 13, wherein compounds which can be incorporated into the PET polymer molecules and thus lead to a higher copolymer fraction are used as chain breakers.

19. The method according to claim 1, wherein the post-consumer PET starting material used, upstream of the drying and recycling in method step d), has a copolymer fraction of not more than about 3%.

20. The method according to claim 1, wherein the method step f) is carried out in such a manner that the copolymer fraction in the rPET, in total, is raised to 2.5% to 8%.

21. The method according to claim 1, wherein a decontamination of the post-consumer input goods is carried out by degassing the volatile contaminants at elevated temperature between 70° C. and 330° C., before the recycling extruder, i.e., method step d), and/or in the recycling extruder and/or after the recycling extruder, with a vacuum of less than 0.2 bar absolute, and/or with nitrogen flushing between 0.1 sec and 20 hours.

22. The method according to claim 1, wherein the material is decontaminated to such an extent before the actual injection-molding method step f) that it is suitable for applications in the food and/or utensils sector.

23. The method according to claim 1, wherein a master batch is produced using material from method step d) and a chain breaker, and this master batch is metered directly into the inlet of the injection-molding machine.

24. The method according to claim 1, wherein, method step c), the comminuted PET material is dried at temperatures between 60° C. and 180° C.

25. The method according to claim 1, wherein the crystallization fraction of the treated rPET injection-molded part is reduced by at least 10% compared to the untreated material without an increased copolymer fraction.

26. The method according to claim 1, wherein the extruded melt is filtered before the granulation.

27. The method according to claim 1, wherein the extruded melt is pressed through a hole filter having a hole size between 30 μm and 300 μm.

28. The method according to claim 1, wherein the material is degassed during the extrusion in method step d).

29. The method according to claim 1, wherein the melt is divided into thin layers or strands in the extruder.

30. The method according to claim 1, wherein the extrusion in method step f) is carried out in a vacuum or in a protective gas atmosphere, and particularly under nitrogen.

31. The method according to claim 1, wherein the residence time of the polyester material in the injection-molding unit or recycling extruder is in each case between 20 sec and 400 sec.

32. The method according to claim 1, wherein the method is an alternative form of injection-molding and/or a mixed form of injection-molding in the sense of compression molding or injection foaming.

33. The method according to claim 1, wherein the temperature during extrusion and the residence time of the material in the extruder are selected such that the extruded material has an intrinsic viscosity (IV) between 0.52 dL/g and 0.68 dL/g.

* * * * *